(12) United States Patent
Maniscalco et al.

(10) Patent No.: US 8,667,088 B1
(45) Date of Patent: Mar. 4, 2014

(54) DISTRIBUTION NETWORK PROVIDING CUSTOMIZED CONTENT AT DELIVERY

(75) Inventors: Nicholas J. Maniscalco, Seattle, WA (US); Ryan J. Snodgrass, Kirkland, WA (US); Michael Yang, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 864 days.

(21) Appl. No.: 12/615,787

(22) Filed: Nov. 10, 2009

(51) Int. Cl.
*G06F 15/16* (2006.01)
(52) U.S. Cl.
USPC .............. 709/219; 705/7.34; 725/35; 725/36; 725/46; 725/54
(58) Field of Classification Search
USPC .......................................... 709/202, 217–219
See application file for complete search history.

(56) References Cited

U.S. PATENT DOCUMENTS

| | | | |
|---|---|---|---|
| 6,748,386 B1* | 6/2004 | Li | 1/1 |
| 2003/0051253 A1* | 3/2003 | Barone, Jr. | 725/112 |
| 2006/0029093 A1* | 2/2006 | Van Rossum | 370/432 |

* cited by examiner

*Primary Examiner* — Tauqir Hussain
(74) *Attorney, Agent, or Firm* — Novak Druce Connolly Bove + Quigg LLP (57) ABSTRACT

Objects in a content delivery network are modified at delivery to users. Individual content servers include copies of the content objects and receive requests from users for a copy of the object. The request includes a program from the content provider on how the content object is to be modified at delivery to the user. The program is executed on delivery of the object to provide the user with a modified content object. Modification can occur as the content is delivered from the content server to the user.

24 Claims, 9 Drawing Sheets

DISTRIBUTION NETWORK PROVIDING CUSTOMIZED CONTENT AT DELIVERY

BACKGROUND

Companies providing content via the Internet generally seek to lower the cost of doing so while providing high availability. Some content providers may also seek to customize the content provided. Customization can include watermarking content, inserting digital rights management signatures, or other user-specific customizations. Providing customized content generally makes delivering the content more expensive since the customization must be done under the control of the content provider and from delivery points under the control of the provider.

Content delivery networks are delivery systems with geographically dispersed networks of servers. Servers at various locations each store a copy of content and clients requesting the content are routed to the nearest location so the content is delivered with the best possible performance and/or the lowest possible cost. To achieve the best possible performance, the edge locations are typically high performance data centers that are able to respond to requested loads during peak times. To achieve lower cost, techniques are used to direct content delivery requests to servers which may not be under peak load or may be in a data center with a lower cost of operation.

Each server location contains an identical copy of content available from other servers in the content delivery network. This generally makes such networks unsuitable for customization of the delivery of each individual content objects provided to users. Customization of content at each of the servers works against maintaining identical copies in a state ready for delivery to a user. Customizing content in a content delivery network is more difficult where the content delivery network is not maintained by the content provider, but rather a service provider.

DESCRIPTION

Technology is presented which allows the customization of content objects in a distributed delivery network. Base copies of content objects are stored on each of the individual nodes or content delivery servers in a content delivery network. Upon receiving a request for content, a content object can be customized at delivery to the user. The manner of customization can be defined by the content provider in a program embedded in the user request. A service provider or other entity maintaining the content delivery network provides technology allowing the content provider to define the modification program for the content. The program is executed on delivery of the object to provide the user with a modified content object. Modification can occur as the content is delivered from the content server to the user.

Figure 1A:
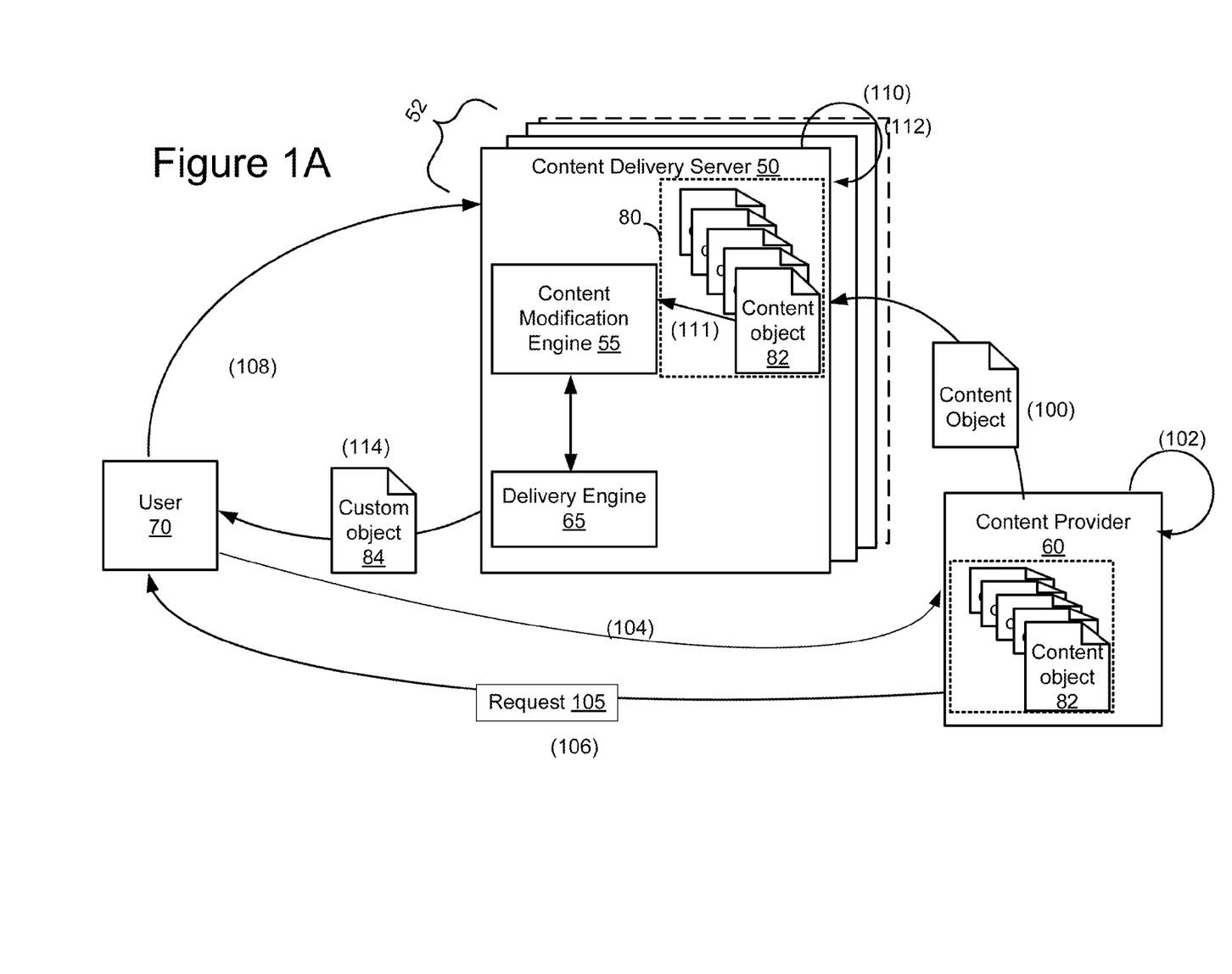
FIG. 1A is a block diagram illustrating a system and method accordance with the present technology

FIG. 1A illustrates a system for implementing the present technology. FIG. 1A illustrates a portion of a content delivery network 52 comprising content delivery servers 50, a content provider 60 and a user 70. For purposes of this description, each element 50, 60, 70 may comprise one or more processing devices under control of a respective entity. It should be further understood that the content delivery network 52, content provider 60 and user 70 are coupled by a communications network, such as the Internet.

One or more content servers 50 make up a content delivery network 52. A content delivery network will be generally understood to comprise a distributed network of processing devices or servers designed to deliver content objects to users in a cost efficient manner. Content delivery servers 50 may be distributed within the content delivery network 52 by geography, subject matter, or other criteria to create efficiencies in the delivery of content objects to be delivered to users 70. Content delivery network 52 responds to delivery requests for content directly from users. Each of content delivery servers 50 may comprise a processing device such as that illustrated below in FIG. 11. The content delivery network may be controlled by a service provider which provides elements of the technology discussed herein to various different content providers as a service or acts as a content provider itself.

Each server 50 may include a set 80 of content objects 82. Content objects 82 may be stored on a content delivery server 50 by the content provider and/or retrieved from the content provider as needed by the content delivery network 52. Each content object comprises a base object which is suitable for modification by a content modification engine 55 prior to delivery. A delivery engine 65 works in concert with the modification engine to deliver and modify content in accordance with the processes discussed herein. Content modification engine 55 and delivery engine 65 may comprise one or more instructions directing a processing device such as that illustrated in FIG. 11 to perform the processing steps defined herein. Each delivery server may include content modification program storage 87 and modification data storage 97. Program storage 87 and modification data storage 97 may be utilized by the content provider instruct the delivery server 50 to modify base objects 82 prior to create custom objects 84 for delivery to users 70 as discussed below. Although a plurality of content delivery objects are illustrated, it should be understood that the technology is suitable for use with one or more content delivery objects. Moreover, the set 80 of content delivery objects present on each content delivery server 50 need not be identical, in one alternative is distributed identically to each of the content servers 50 in the content delivery network.

Content delivery objects 80 are provided to the content delivery server 50 by content provider 60. A content provider 60 may, for example, comprise a video on-demand provider, a music provider, a software developer or distributor, or any other entity which wishes to deliver content to one or more users 70 using the content delivery network 52. The set of content delivery servers 50 comprises a content delivery network 52. Content provider 60 may be one of a plurality of content providers which utilizes the content delivery server network 52. Although only one content provider 60 is shown, it will be understood that numerous different content providers may upload objects to each delivery server 50 in content delivery network 52. Also, while one user 70 is shown, it will be understood that multiple users may access the content delivery network and content delivery servers 50 and the servers 50 may serve multiple requests for content simultaneously.

Figure 1B:
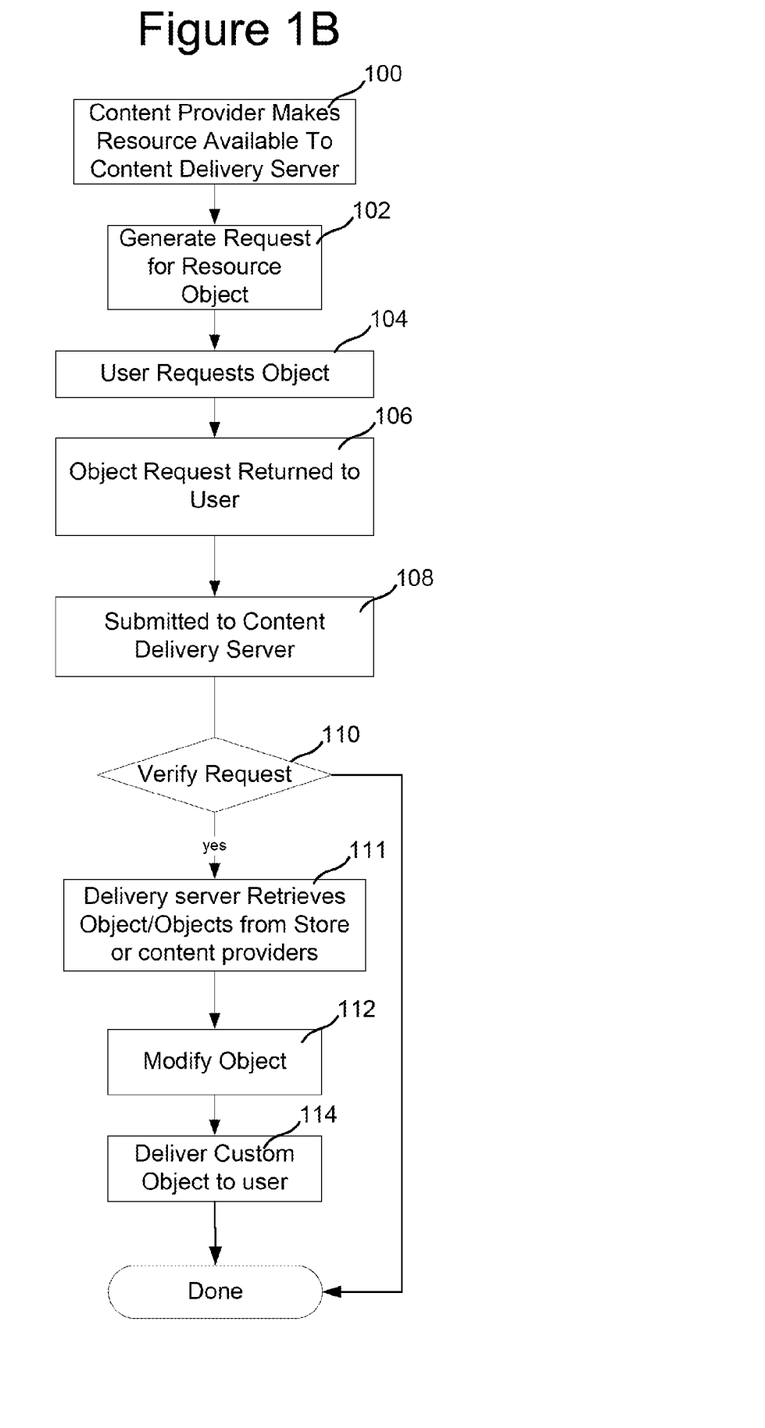
FIG. 1B is a flowchart illustrating a method in accordance with the present technology in conjunction with the system of FIG. 1A.

FIG. 1B is a flowchart illustrating one embodiment of a process for implementing customized objects for delivery to users through the content delivery network 52 is illustrated at 100-114. In accordance with the present technology, a content provider 60 will make a base content resource object available to the content delivery network at 100. In one embodiment, the content provider may upload one or more a base content object or objects at 100 to the content delivery server network 52. In this embodiment, content objects may be pushed to the content delivery server by the content provider at the discretion of the content provider. In an alternative embodiment, the content provider may make the content object available to the content delivery server 50 when the server requests the base object from the content provider. In this alternative, content objects are retrieved by the content delivery server 50 as needed by the server. In another alternative, both content pushes by the content provider and pulls by the delivery server may be utilized. Where content objects are pushed and stored on the delivery server 50, each content delivery server may, using the mechanisms in place in the content delivery network, replicate the content objects throughout the content delivery network 52. Once a base resource object 82 is contained within the object set 80, the object may be modified in accordance with the present technology and delivered to user 70.

In order to allow users 70 to access the objects provided on the delivery server network 52, content provider 60 generates a request at 102. Requests may be generated for each individual user, for a set of users, or based on other customization criteria, to allow users to request the objects 80. In one example, a content provider may provide a website or other computer accessible mechanism which allows users to select, purchase, or otherwise acquire an object request 102. A typical example of an object request would be to select a uniform resource locator (URL) which is directed to the content delivery network 52 to return the object.

At 102, the content provider will generate a content object request 105 and make the content object request 105 available to the user. The content provider may make the object request 105 available to a user via any number of methods. At 104, a user requests a resource object by, for example purchasing a piece of multimedia content. At 106, this request will be delivered to the user. It will be understood that while object 104 is illustrated in FIG. 1A as being created before the user requests the object, the object request 105 may be generated after a user requests the object. A user may request a content object at 104 by an action such as completing a transaction to purchase the object or clicking on an object request hyperlink provided by the content provider 60 which contains the request 105.

Request generation 102 includes the content provider 60 providing specific instructions in the request 105 on where to obtain the content and how the object 82 should be modified prior to delivery. Such instructions comprise a modification program which instructs the content delivery server 50 on how a content object 82 should be modified prior to delivery to the user 70. The program may constitute one or more instructions specifying which portions of the content object to modify, the information the content object should be modified with, the location of information the content object should be modified with, or the location of modification instructions may be retrieved for use in modifying the content object.

After the user requests the object at 104, the request 105 is delivered at 106 and the user initiates a request at 108 to the content delivery network and in particular content delivery server 50. It should be understood that steps 106 and 108 may comprise, for example, the user selecting a hyperlink containing the request 105 which is routed directly to the content delivery network 52. As such, the content request 105 may comprise a URL containing information specified at 102 by the content provider, which is forwarded to the content delivery network 52. In one embodiment, the request may be directed to the content delivery network and distributed to one or more content delivery servers 52 within the content delivery network in accordance with the routing and load balancing policies established by an administrator of the content delivery network. In another alternative, the request may be routed to individual servers 50 within the content delivery network.

When the request 105 is created at 102, the content provider 60 may use one or more forms of authentication and encryption so that authentication can be performed by the content delivery server 50. One example of such authentication may be to use a standard public key encryption (PKE) technology. In this context, the portion of the request generated at 102 may be created and signed with the content provider's private key, allowing the request to be decrypted by the content modification engine 55 when it reaches the content server 50 using the content provider's public key. It should be recognized that any suitable form of authentication for the request may be utilized, and that public key encryption is only one example of how such authentication may occur.

Once the request 105 containing the program reaches the content delivery server 50, the content delivery server may verify the authenticity of the request at 110. This may occur by decrypting the content request and/or authenticating the content request or a portion of the request at 110. Once the request is received and authenticated, the base content object is retrieved from store 80 or from the content providers at 111. At 112, instructions in the request are performed to modify the content object. In one embodiment, this comprises modifying the content object prior to or during delivery of the content object by the delivery engine 65 to the user. As described in further detail below, the content modification engine 55 will retrieve a base content object 82 in from the content object set 80, and modify the base content object 82 in conjunction with the delivery engine 65 to provide at 114 a custom object 84 to user 70. As noted below with respect to FIGS. 3 and 4, the content may be entirely modified prior to delivery, or modified "on the fly" as various segments or blocks of data are transmitted by the delivery engine 65. In this manner, the content request 105 can be directed to any one of the content delivery servers 50, allowing the content provider to take advantage of the distributed nature of the content delivery network 52 to deliver content to user 70 in a relatively inexpensive fashion.

Figure 2:
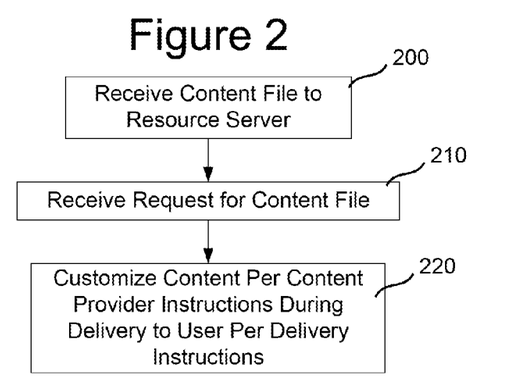
FIG. 2 is a flowchart illustrating a general method for customizing content in a content delivery network.

FIG. 2 is a flow chart illustrating an exemplary method performed by an individual content delivery server 50 in accordance with the present technology. At 200, content delivery server 50 will receive a content object 82 in its data storage system. This receipt may occur directly from the content provider 60 or through an internal replication mechanism implemented in the content network 52. The content delivery server 50 will then receive a request 105 for a customized content file at 210. This request, illustrated at 108 above in FIG. 1A, contains a program for modifying the content (and in particular base content object 82) prior to delivery to the user 70. At 220, the content delivery server 50 will customize the content per the program in the request during delivery of the content to the user. It will be recognized that steps 200 and 210 may be reversed, such that the request 105 is received before the a content object requested is stored on the delivery server 50 and the server 50 may pull a based content object 82 from the content provider after receiving the request 105.

Figure 3A:
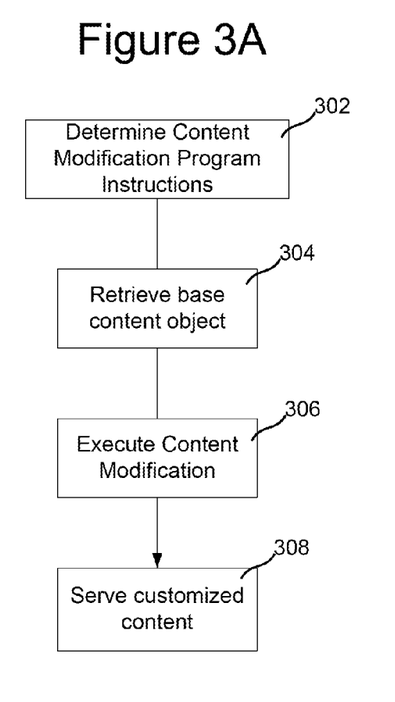
FIG. 3A is a flowchart illustrating a first alternative for customizing content prior to delivery.
Figure 3B:
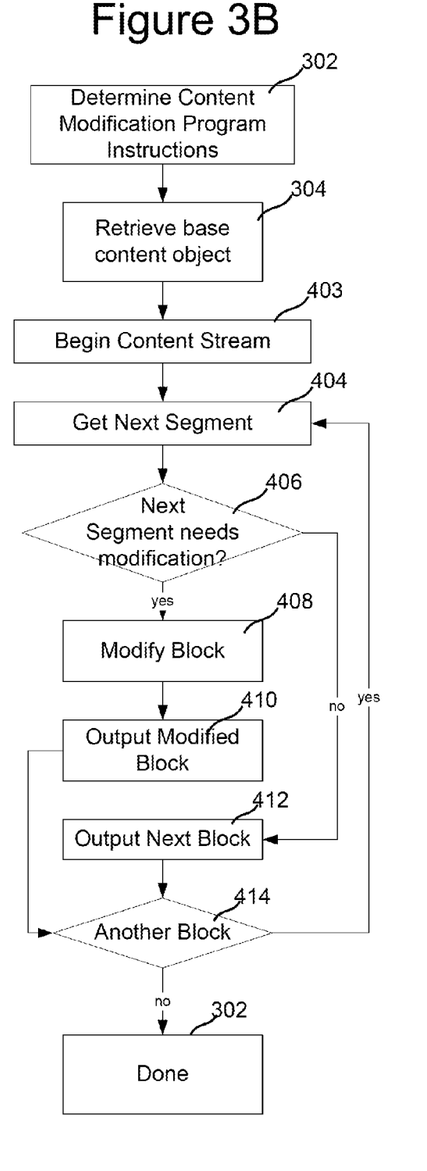
FIG. 3B is a flowchart illustrating a second alternative for customizing content during delivery.

FIGS. 3A and 3B are flow charts illustrating a first example and second example of customizing the content in accordance with 220. In FIG. 3A, the content is completely customized prior to delivery to the user and output from the content delivery server 50. In FIG. 3B, the content is modified "on the fly" as various sections or blocks of content are streamed from the delivery engine 65.

In FIG. 3A, at 302, the content delivery server first determines and parses the content modification program from the request 105. As noted below, the program can be contained within a uniform resource locator and provided in the request 108. At 304, the base content object 82 from content object set 80 is retrieved, and content modification is completed at 306. Various examples of content modification instructions sets are illustrated in FIGS. 6A, 7A, 8A and 9A. Various examples of content modification are illustrated in FIGS. 6B, 7B, 8B and 9B. Once content modification is completed at 306, the customized content can be served at 308.

FIG. 3B represents an alternative to 220 where the content modification occurs "on the fly" as the content is streamed from the server. In FIG. 3B, the content modification program is determined at 302 and the base object is retrieved at 304 in a manner equivalent to that shown in FIG. 3. At 403, a first portion of a content stream is served. Normally, delivery protocols deliver data in sections or blocks. For example, the Transmission Control Protocol/Internet Protocol (TCP/IP) uses a series of packets to transmit data in accordance with well known standards. It should be recognized that any transport protocol may be utilized, and hence any segment, packet or block of data may be suitable for modification in accordance with the program provided by the content provider 60. Once the next segment of data is retrieved at 404, a determination is made at 406 whether the program instructions parsed at 302 require modification of that segment of the base content object for delivery to the user. If modification is required, then at 408 the segment is modified and the modified segment is output at 410. The modification occurs prior to delivery to the user. If no modification is required in a particular segment at 406, that segment is output at 412 unchanged from its original context in the base content object. If another block exists at 414, steps 404-414 are repeated until each segment of data on the content object has been delivered to the user in either modified or unmodified format.

Figure 4:
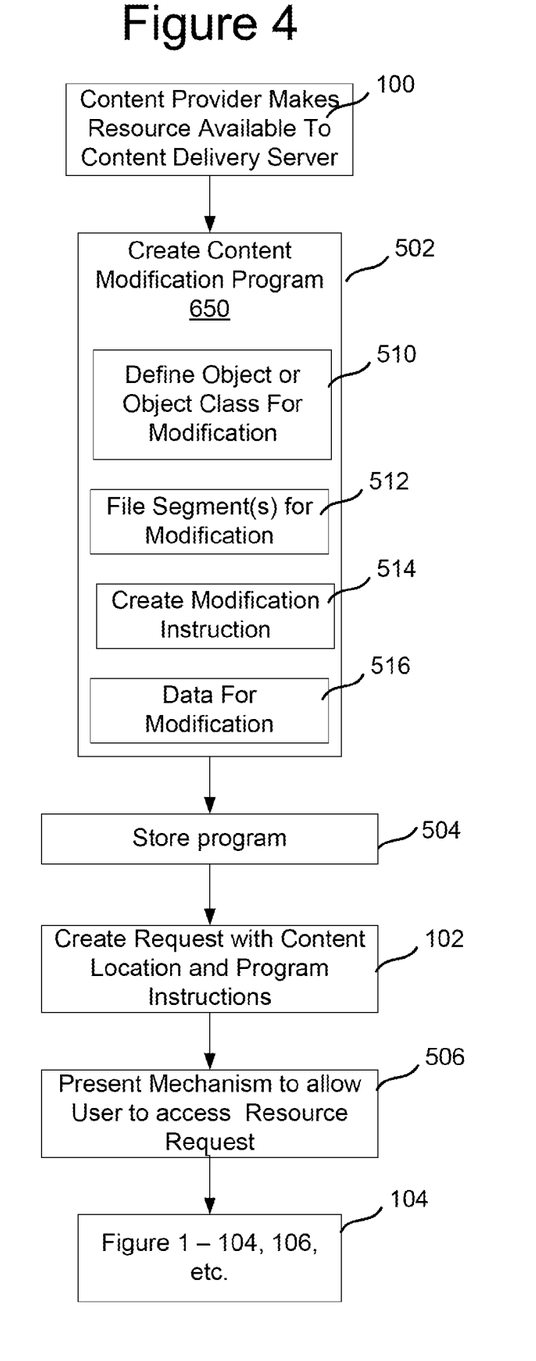
FIG. 4 is a flowchart illustrating steps performed by a content provider to create a program for modifying content objects on delivery to a user.

FIG. 4 represents a method performed by a content provider to provide customized delivery content using the technology described herein. At 502, the content provider 60 will create a content modification program. As noted above, examples of content modification instructions are illustrated in FIGS. 6A, 7A, 8A and 9A. Creation of a content modification program may, in one embodiment, take place in a standard instruction language and constructs provided by the service provider running the content delivery network 52. Using a standard instruction language and constructs allows various content providers to define a series of actions within the constraints defined by the service provider, while allowing the service provider to receive programs in a standardized form from different content providers. In construction of a content modification program 650, at 510 the user will define one or more objects or object classes to which the program applies. For example, the content provider may specify the program applies to each instance of a request for a content object comprising a movie or audio file, or applies to a class comprising all audio files. At 512, the content provider may identify one or more segments of the file for modification. At 514, the content provider will create one or more modification instructions. Each instruction may, for example, indicate how a segment of an object is to be modified. At 516, the content provider may provide specific data, or operations, to be used in the modification instruction at 514. Other instructions may include retrieving data or instructions from a specific location within the content deliver server 50, network 52 or another network accessible location.

Once the program is created at 502 and base objects made available at 100, content requests 105 can be created at 102 (as discussed above). It should be recognized that creation of the content modification program 502 and making the base content object available to the resource server at 100 can be performed in any particular order. That is, uploading of the base objects 82 at 100 may occur prior to, contemporaneous with or after delivery of base content objects. Likewise, creation of modification programs at 502 may be performed multiple times for each base content object. For example, a content provider may decide to change the manner in which modification occurs on of base objects, and can alter the manner by which the content is modified by simply altering the modification program. Once base objects are present in the content object set 80 and content modification programs 502 have been created, a request is created at 102. For one or more requests being generated at any given time, the request may be customized for individual users, a group of users, or based on any criteria which the content provider decides to use to customize individual content objects.

Optionally at 504, the program may be stored. As discussed below, storage of the program may comprise simply storing the request with included instructions embedded in the request, or storing the program at an alternative location which can be accessed by the content delivery server 50 when modification of content is required. At 506, the content provider may present a mechanism for allowing user 70 to access the requests which have been generated. As noted above, this may comprise a store front or other Internet based access portal to allow the request to be provided to the user which can then be transmitted at 108 in FIG. 1A to the content delivery server 60. Once the mechanism is created and available, the content provider awaits a user request 104 for the content at 104, as illustrated above in FIG. 1A.

Figure 5:
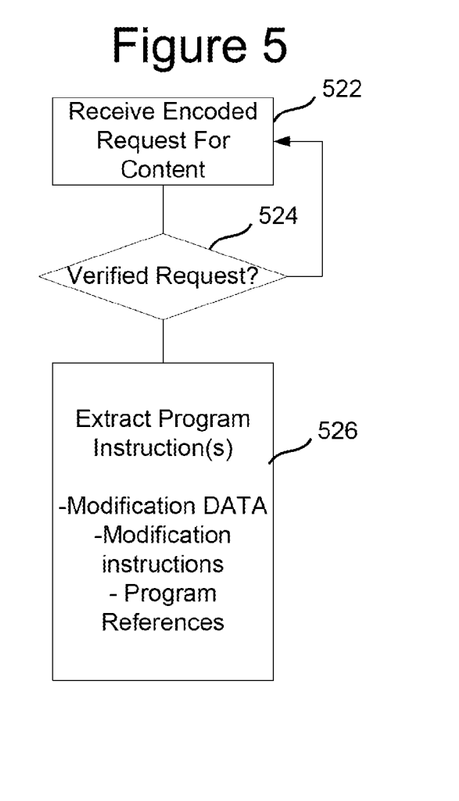
FIG. 5 is a flowchart illustrating a method performed by the content delivery network to extract program instructions from a request for content.

FIG. 5 illustrates an exemplary process which may be performed at 302 discussed above with respect to FIGS. 3A and 3B to determine content modification program instructions. When a request for content 105 is received at 522, the request may be encoded, encrypted, and/or signed by the content provider. At 624, a determination is made as to whether or not the request is verified using the authentication or verification scheme utilized by the content provider and the content delivery server 50. If the request is verified, program instructions are extracted at 526. The program instructions may include, for example, modification data to be used to modify the content object, modification instructions specifying where to utilize the modification data within the content object, program references indicating locations where instructions and/or data may be retrieved by the content modification engine during the modification process.

In one example, modification data may include a user identification, and modification instructions may instruct the content modification engine 55 to write the user identification data into various portions of the content stream while the content stream is being delivered. As will be discussed below, numerous alternatives exist for the data, the instructions and the content.

Figure 6A:
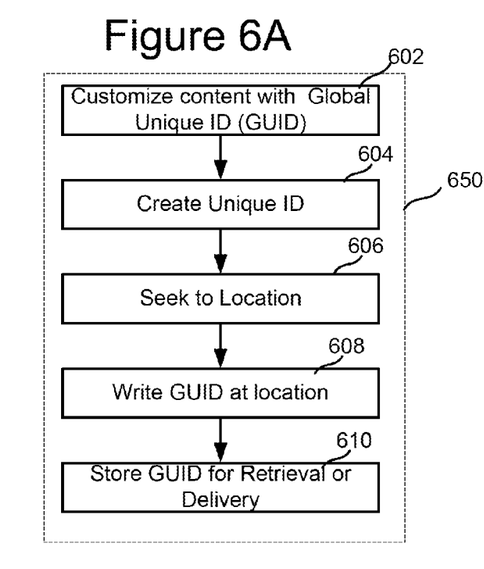
FIGS. 6A, 7A, 8A and 9A are flowcharts illustrating alternative programs for modifying content.
Figure 6B:
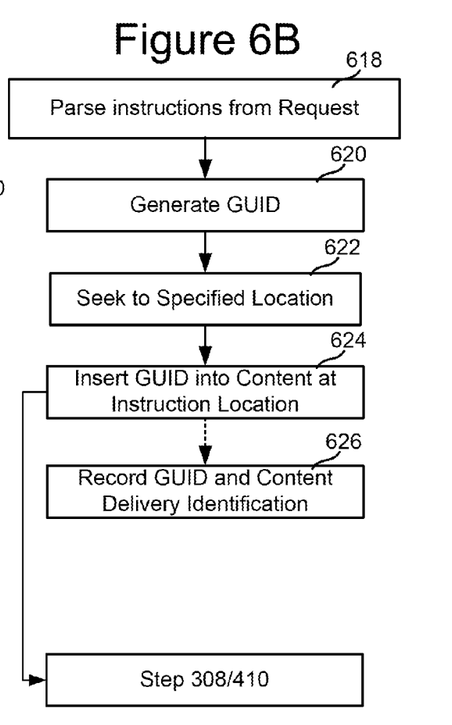
FIGS. 6B, 7B, 8B and 9B are flowcharts illustrating process flow at the content server upon receipt of the programs in FIGS. 6A, 7A, 8A and 9A, respectively.

FIGS. 6A and 6B illustrate program instructions provided by a content provider (FIG. 6A) in a program 650, and the corresponding actions performed by the content delivery server 50 (FIG. 6B) in response to the program instructions illustrated in FIG. 6A. In this example, a unique identifier is generated by the content delivery server and written into a specified location in the base content object prior to delivery.

In FIG. 6A, instructions provided by the provider may comprise requesting that a unique identifier be generated by the content delivery server and inserted at one or more locations in the content object. In this example, the content modification engine 55 may include a facility to generate globally unique identifiers (GUIDs) based on one or more input criteria. At 602, the modification program may include an instruction to customize an outgoing piece of content with a globally unique identifier (GUID). At 604, an instruction is provided to create the GUID, and at 606, an instruction is provided to seek to a given location within the content object being delivered. At 608, an instruction is included to write the GUID at the location specified in 606, and at 610, an instruction is provided to store the GUID with an association to the content object delivery for later retrieval by or delivery to the content provider 60.

At FIG. 6B, when the instruction set forth in FIG. 6A is received at the content delivery server 50, the delivery server 50 will first parse the instructions at 618. In accordance with the instructions, the content modification engine 55 will create a GUID at 620, seek to the defined location at 622, insert the GUID into the content at 624 and proceed to steps 308 or 410 depending on the mechanism being used for delivery. In accordance with the store instruction 610, at 626 the GUID and a delivery identifier will be recorded.

Figure 7A:
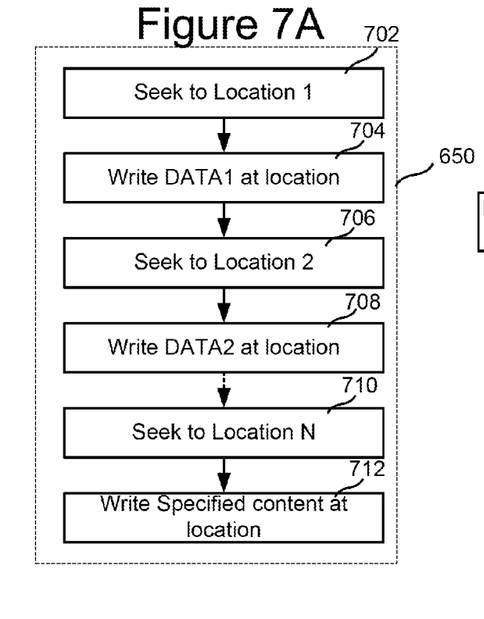
Figure 7B:
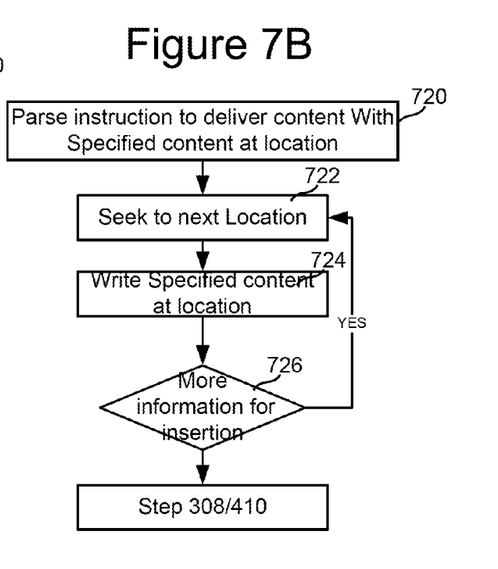

FIGS. 7A and 7B illustrate program instructions provided by a content provider (FIG. 7A) and the corresponding actions performed by the content delivery server 50 (FIG. 7B) in a content marking scheme. In this example, specified data provided by the content provider is written into multiple locations in a base content object.

In FIG. 7A, the content modification program may include an instruction 702 to seek to a first location, write at 704 specified data (DATA1) at location 1, seek 706 to a second location, and write second specified data (DATA2) at 708. The sequence may be repeated multiple times to seek 710 to a given location N and write 712 specified content at location N. Upon receipt of the instructions at 720, as illustrated in FIG. 7B, the content delivery server will parse the instructions and content to be written, seek to the defined location at 722, write the specified data at 724, and if additional data and locations exist at 726, repeat steps 724 and 722 until the instructions end at which point delivery will be completed at steps 308 or 410.

Figure 8A:
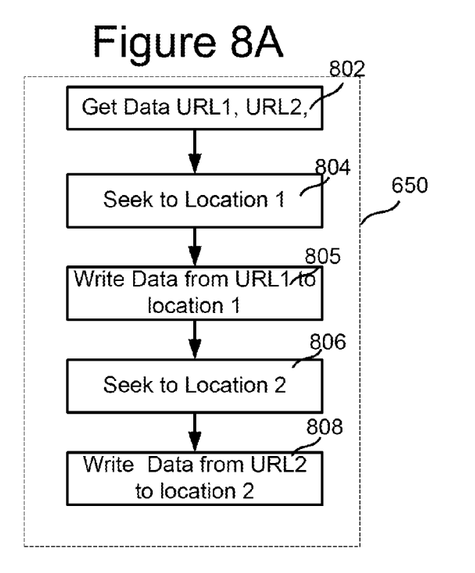
Figure 8B:
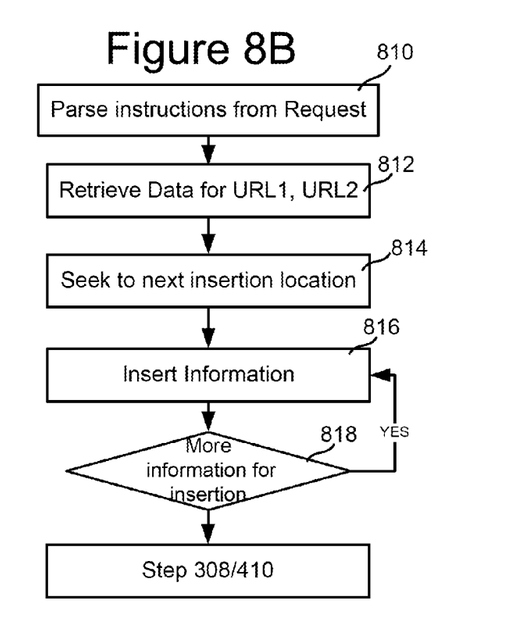

FIGS. 8A and 8B illustrate a program set of instructions (FIG. 8A) and the actions performed by content delivery server (FIG. 8B) in response to the instructions in FIG. 8A. In this example, data to be inserted into a base content object is provided at a secondary location identified by, for example, a URL. At 802, a get instruction specifies the location where the modification data may be obtained. At 802, the location is specified as URL1 and URL2. Numerous different sets of data, at different URLs, may be utilized in accordance with the present technology. Other means of identifying the location of the modification data other than a URL may be utilized. At 804, a seek instruction indicates a first location where the data is to be written, and at 805, a write instruction specifies that data from URL1 should be written to location 1. Similarly, a seek instruction to location 2 is provided at 806, and a write instruction for the data at URL2 specified at 808. It should be recognized that steps 805, 806 and 808 may be repeated for as much data and as many locations in the file as may be required. When the instructions denoted in FIG. 8A are retrieved by the content delivery server 50, at 810, the program instructions are parsed and at 806, the content delivery server 50 will retrieve the modification data from the location specified, seek to the next insertion location at 814, insert the information at 816. At 818, if additional insertions or modifications are specified, steps 814 and 816 are for each insertion location specified.

Figure 9A:
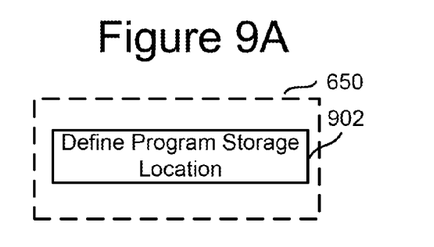
Figure 9B:
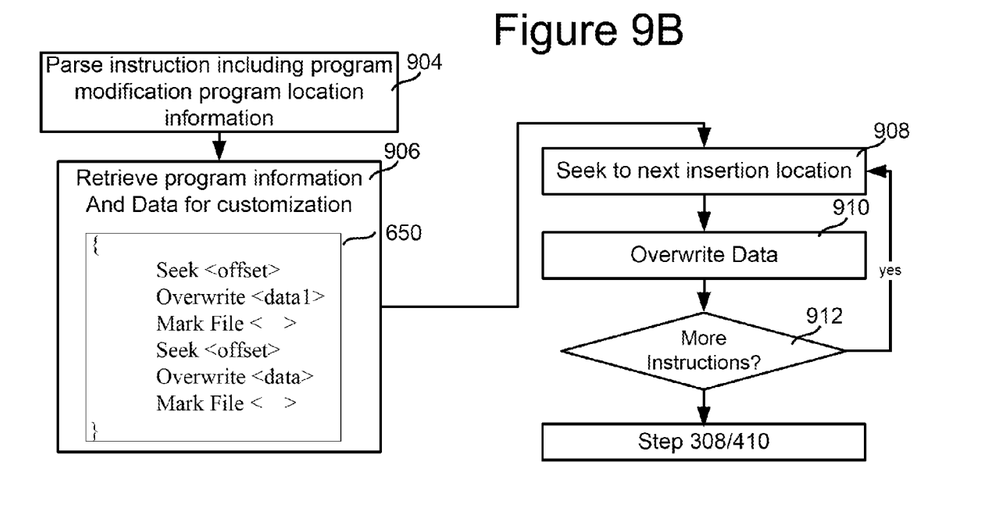

FIGS. 9A and 9B illustrate a program set of instructions (FIG. 9A) and the actions performed by content delivery server (FIG. 9B) in response to the instructions in FIG. 9A. In this example, the data and program specifying the modification operation are located at a defined storage location accessible by the content delivery server 50. At step 902, a single instruction specifics the location of the modification program. In one example, this location may comprise the program storage 87 on the content delivery server 50. In FIG. 9B, when the content modification server 50 receives the instructions at 904 it parses the location and at 906, retrieves the program and any data for customization. At 906, a program 650 is illustrated with seeks to a first offset, overwrites data and marks the file. In accordance with the instructions, the server seeks to that next location at 908, overwrites the location with specified data, and repeats at 912 until all instructions are completed at 912.

Figure 10A:
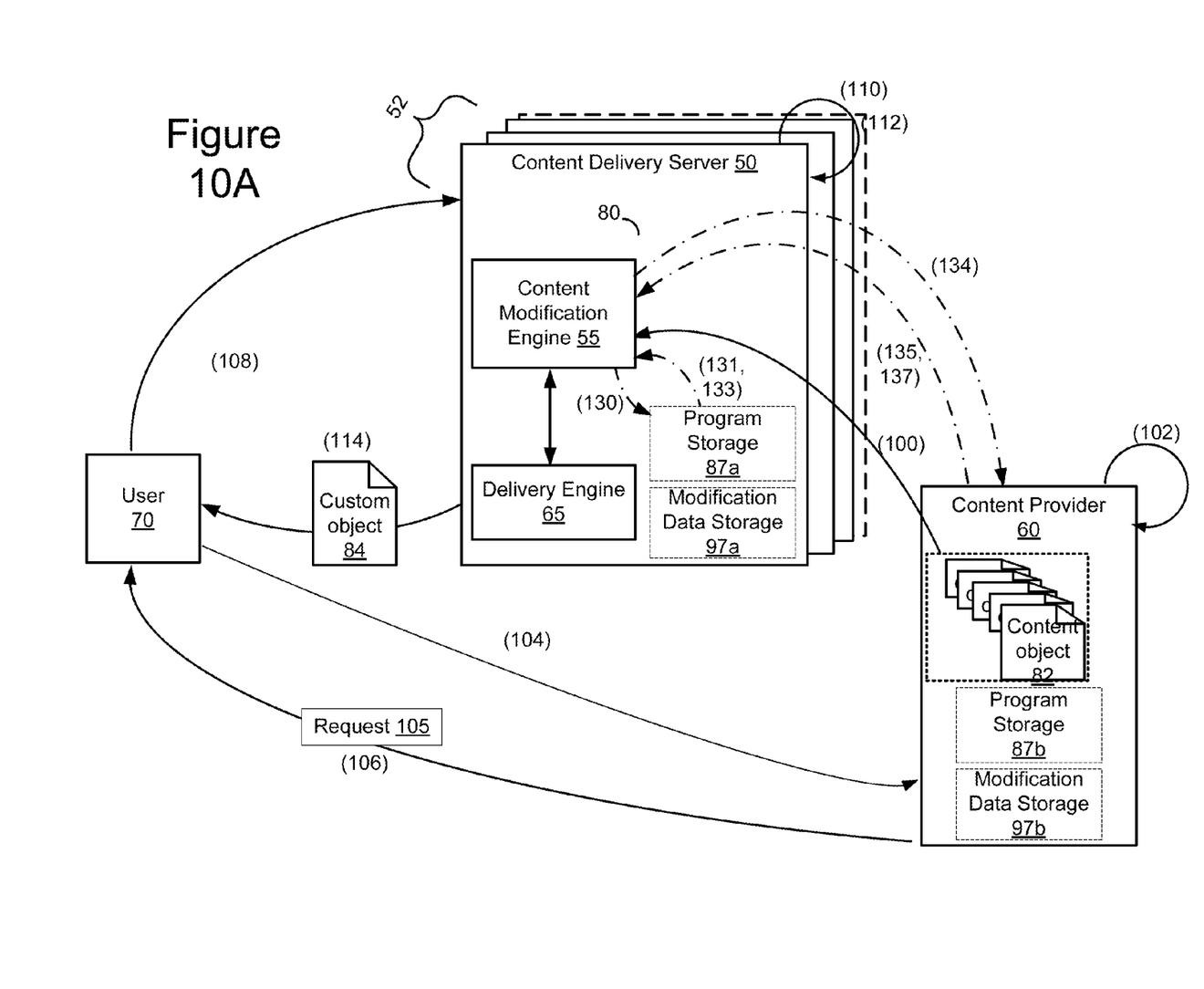
FIG. 10A is a block diagram illustrating a second system and method accordance with the present technology.

FIG. 10A is a block diagram illustrating alternative embodiments of systems for implementing a content provider 60 and a content delivery server in which one or both systems include program storage 87a, 87b and modification data storage 97a, 97b. As noted above in FIGS. 8a and 8b, in various embodiments, the program instructions and modification data may be retrieved from program storage and data storage locations are referenced by the request 105. In one embodiment, program storage 87a and modification data storage 97a may be provided on the content delivery server. In another embodiment, program storage 87b and modification data storage 97b may be provided on the content provider server 60. In some alternatives, the content delivery server 50 alone may include the program and modification data storage, the content provider 60 alone may include the program and modification data storage, both may include program and modification data storage (as illustrated in FIG. 10A), or neither may include program and modification data storage. In various alternatives, program instruction and modification data retrieval occurs from the content provider, the content deliver server, both, or neither (with the instructions and data being contained in the request itself). For example, either of program storage 87a or 87b may comprise the storage location of one or more programs discussed above with respect to FIG. 9A.

Figure 10B:
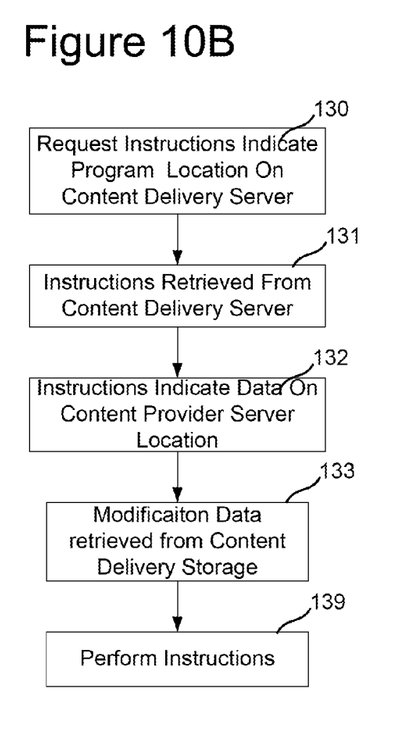
FIGS. 10B and 10C are flowcharts illustrating two alternatives to retrieving program instructions and modification data in the system of FIG. 10A.
Figure 10C:
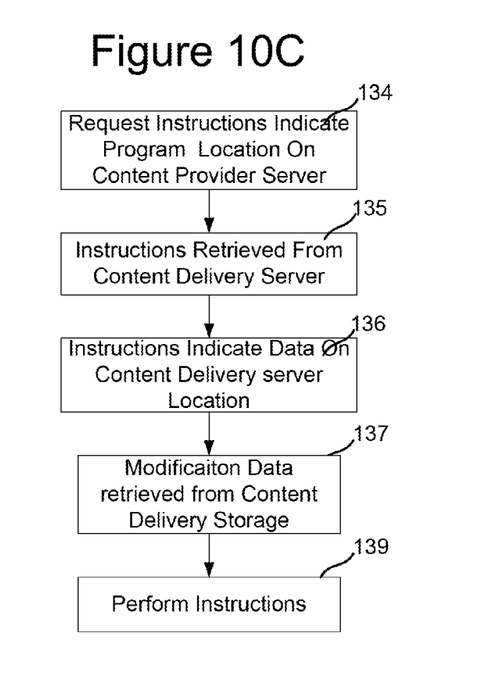

FIGS. 10B-10C illustrate a number of alternatives for implementing the present technology using the variations on the system illustrated in FIG. 10A. With reference to FIG. 9A wherein a single instruction may be used to retrieve the program from a storage location, FIG. 10B illustrates one example where the program instructions and the modification data are stored in the program storage 87a and modification data storage 97a on the content delivery server. In FIG. 10B, when an instruction referenced in the request 105 indicates at 130 that program instructions are located in a location on the content delivery server 50, the instructions will be retrieved at 131 from program data storage 87a. At 132, the program instructions retrieved indicate that the modification data used for modifying the content object are located in the content delivery server at modification data storage 97a, and modification data is therefore retrieved from data storage 97a at 133. The modification instructions can then be performed using the data at 139. Similarly, in FIG. 10C, when an instruction referenced in the request 105 indicates at 134 that program instructions are located in a location on the content provider's server 60, the instructions will be retrieved at 135 from program data storage 87b. At 136, the program instructions retrieved indicate that the modification data used for modifying the content object are located in the content delivery server at modification data storage 97b, and modification data is therefore retrieved from data storage 97b at 137. The modification instructions can then be performed using the data at 139. Any number of variations may exist in where the program and data are stored. In large scale replacement, where, for example, data on the order of hundreds of megabytes in large content objects is being replaced, it may be more efficient to load the modification data on the content server in storage 97a, and/or use a limited set of content data. Any number of request/response protocols may be utilized to retrieve the program instructions 650 from program storage.

Figure 11:
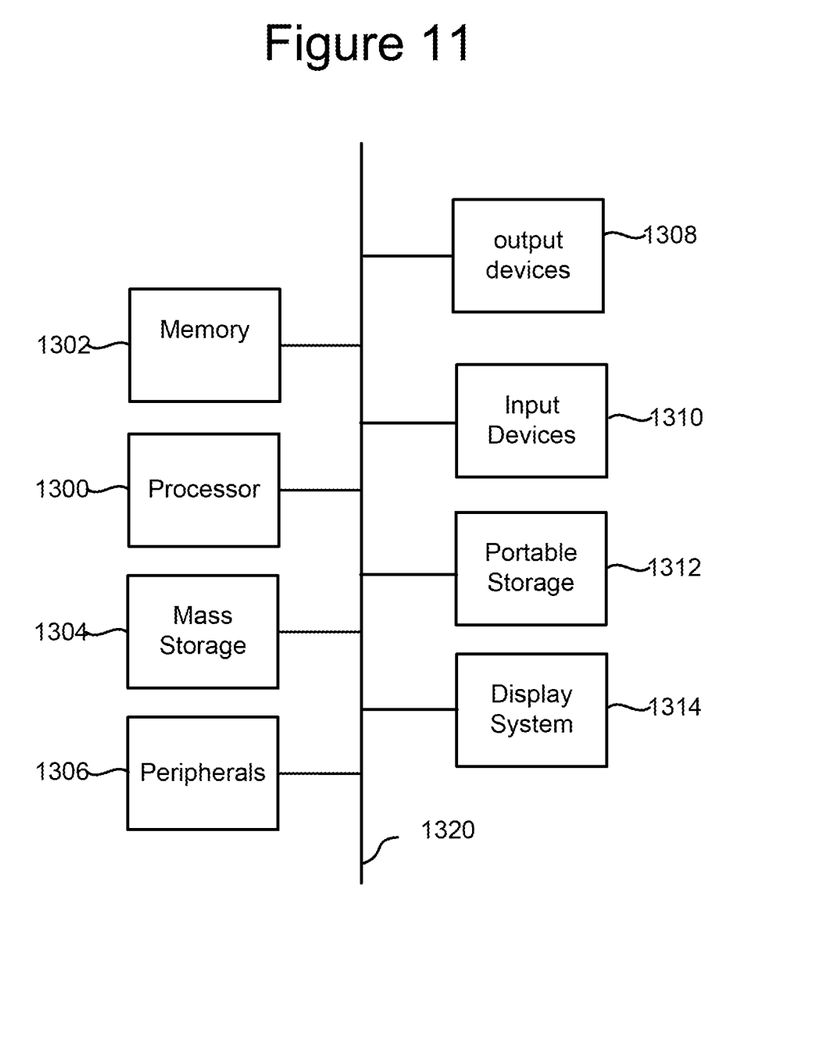
FIG. 11 illustrates an exemplary hardware computing device for the present technology.

FIG. 11 is a high-level diagram of the computing system which can be used to implement any of the computing devices discussed herein. The computing system of FIG. 11 includes processor 1300, memory 1302, mass storage device 1304, peripherals 1306, output devices 1308, input devices 1310, portable storage 1312, and display system 1314. For purposes of simplicity, the components shown in FIG. 13 are depicted as being connected via single bus 1320. However, the components may be connected through one or more data transport means. In one alternative, processor 1300 and memory 1302 may be connected via a local microprocessor bus, and the mass storage device 1304, peripheral device 1306, portable storage 1312 and display system 1314 may be connected via one or more input/output buses.

Processor 1300 may contain a single microprocessor, or may contain a plurality of microprocessors for configuring the computer system as a multiprocessor system. Memory 1302 stores instructions and data for execution by processor 1300. If the technology described herein is wholly or partially implemented in software, memory 1302 (which may include one or more memory devices) will store the executable code for programming processor 1300 to perform the processes described herein. In one embodiment, memory 1302 may include banks of dynamic random access memory, high speed cache memory, flash memory, other nonvolatile memory, and/or other storage elements.

Mass storage device 1304, which may be implemented with a magnetic disc drive or optical disc drive, is a nonvolatile storage device for storing data and code. In one embodiment, mass storage device 1304 stores the system software that instructs processor 1300 to implement the technology described herein.

Portable storage device 1312 operates in conjunction with a portable nonvolatile storage medium, such as a floppy disc, CD-RW, flash memory card/drive, etc., to input and output data and code to and from the computing system of FIG. 12. In one embodiment, system software for implementing the present technology is stored on such a portable medium, and is input to the computer system via portable storage medium drive 1312.

Peripheral devices 1306 may include any type of computer support device, such as an input/output interface, to add additional functionality to the computer system. For example, peripheral devices 1306 may include a network interface for connecting the computer system to a network, a modem, a router, a wireless communication device, etc. Input devices 1310 provide a portion of a user interface, and may include a keyboard or pointing device (e.g. mouse, track ball, etc.). In order to display textual and graphical information, the computing system of FIG. 13 will (optionally) have an output display system 1314, which may include a video card and monitor. Output devices 1308 can include speakers, printers, network interfaces, etc.

The components depicted in the computing system of FIG. 12 are those typically found in computing systems suitable for use with the technology described herein, and are intended to represent a broad category of such computer components that are well known in the art. Many different bus configurations, network platforms, operating systems can be used. The technology described herein is not limited to any particular computing system.

It should be understood that numerous variants exist in accordance with the above technology. Variations in the types of programs which may be used in the request, the data content of the requests, the instructions in the request and the modifications made to the content object are possible. Modifications may include not only modifying the data in a content object but also modifying the content delivery experience. For example, the program may specify a data delivery rate for the user based on the user experience that the content provider wishes to provide.

In yet another variation, two or more content objects may be modified and joined together in response to a request. A request 105 may include a program which specifies two or more content objects which are to be joined using modification data, or joined and then modified using modification data. The modification instruction can include, for example, merging two differently formatted files, such as an audio file and a video file. This would allow, for example, different audio tracks in different languages to be distributed with a common video track, with the modification of the video file being performed in accordance with the techniques described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for delivering a customized content object from a content delivery network to a user, comprising:

under control of one or more computer systems configured with executable instructions, receiving a request, from a content provider to the content delivery network, to deliver a content object to the user, the request including a program from the content provider for modifying a base copy of the content object;

causing the program to be executed to modify the base copy, the program performing:

determining one or more segments of the base copy to modify;

obtaining customized data for modifying the base copy; and generating the content object based at least in part upon rewriting the one or more segments of the base copy using the customized data; and delivering the content object from the content delivery network to the user.

2. The computer-implemented method of claim 1, wherein the program is executed before delivering the content object to the user.

3. The computer-implemented method of claim 1, wherein delivering the content object includes streaming the content object to the user, and the program is executed on the one or more segments of the base copy while streaming the content object to the user.

4. The computer-implemented method of claim 1 wherein the customized data is generated by a delivery server of the content delivery network.

5. The computer-implemented method of claim 1 wherein the the customized data is provided by the content provider.

6. The computer-implemented method of claim 1 wherein the customized data is provided in one of the request or a location defined in the request.

7. The computer-implemented method of claim 1, wherein the program includes at least one instruction defining a location of the customized data.

8. The computer-implemented method of claim 1, wherein the program includes at least one instruction defining a location of instructions to modify the base copy.

9. A content delivery network comprising:

a plurality of servers, at least one server including:

a base object store in nonvolatile memory of the at least one server, the base object store including a set of base content objects;

a processing device communicating with the nonvolatile memory and random access memory, the at least one server including code in the nonvolatile memory for programming the processing device to:

receive a request from a content provider to deliver a content object to a user, the request including a program from the content provider for modifying a base object, of the set of base content objects, corresponding to the content object;

cause the program to be executed to modify the base object, the program performing:

determining one or more segments of the base object to modify;

obtaining customized data for modifying the base object; and generating the content object based at least in part upon rewriting the one or more segments of the base object using the customized data; and deliver the content object to the user.

10. One or more processor readable storage devices having processor readable code stored thereon, the processor readable code causing one or more processors to perform a method comprising:

receiving to a content delivery network a plurality of base copies of content objects from a content provider;

storing the plurality of base copies of content objects at the content delivery network;

receiving a request from the content provider to the content delivery network to deliver a content object to a user, the request including a program from the content provider for modifying a base copy of the content object in the plurality of base copies of content objects;

causing the program to be executed to modify the base copy, the program performing:

determining one or more segments of the base copy to modify;

obtaining customized data for modifying the base copy; and generating the content object based at least in part upon rewriting the one or more segments of the base copy using the customized data; and delivering the content object from the content delivery network to the user.

11. The one or more processor readable storage devices of claim 10, wherein delivering the content object includes streaming the content object, and the program is executed on the one or more segments of the base copy while streaming the content object to the user.

12. The one or more processor readable storage devices of claim 10 wherein the customized data is generated by a delivery server of the content delivery network.

13. The one or more processor readable storage devices of claim 10 wherein the customized data is provided by the content provider.

14. The one or more processor readable storage devices of claim 10 wherein the customized data is provided in one of the request or a location defined in the request.

15. The one or more processor readable storage devices of claim 10, wherein the program includes at least one instruction defining a location of the customized data.

16. The one or more processor readable storage devices of claim 10, wherein the program includes at least one instruction defining a location of instructions to modify the base copy.

17. The one or more processor readable storage devices of claim 10, wherein the program is executed before delivering the content object to the user.

18. The content delivery network of claim 9, wherein the program is executed before the content object is delivered to the user.

19. The content delivery network of claim 9, wherein delivering the object includes streaming the content object, and the program is executed on the one or segments of the base object while streaming the content object to the user.

20. The content delivery network of claim 9, wherein the customized data is generated by the at least one server.

21. The content delivery network of claim 9, wherein the customized data is provided by the content provider.

22. The content delivery network of claim 9, wherein the customized data is provided in one of the request or a location defined in the request.

23. The content delivery network of claim 9, wherein the program includes at least one instruction defining a location of the customized data.

24. The content delivery network of claim 9, wherein the program includes at least one instruction defining a location of instructions to modify the base object.

\* \* \* \* \*